Oct. 12, 1965 J. FREED 3,210,817

MEANS FOR ATTACHING BUTTONS

Filed Oct. 1, 1962 3 Sheets-Sheet 1

INVENTOR.
JOSEPH FREED
BY
Kleinberg & Lilling
ATTORNEYS

Oct. 12, 1965 J. FREED 3,210,817

MEANS FOR ATTACHING BUTTONS

Filed Oct. 1, 1962 3 Sheets-Sheet 2

INVENTOR.
JOSEPH FREED

BY Kleinberg & Lilling

ATTORNEYS

INVENTOR.
JOSEPH FREED
BY
Kleinberg & Lilling
ATTORNEYS

United States Patent Office 3,210,817
Patented Oct. 12, 1965

3,210,817

MEANS FOR ATTACHING BUTTONS

Joseph Freed, 349 Beck St., Bronx 59, N.Y.

Filed Oct. 1, 1962, Ser. No. 227,449
1 Claim. (Cl. 24—103)

The invention here presented is broadly in the field of the fastening art; more specifically it presents a new and improved garment button; and in detail, it is concerned with a removable button construction.

Garment buttons of many types and configurations are well known. Such buttons are generally attached to a garment or the like by passing a thread one or more times therethrough in a well known manner.

Such usual garment buttons have several disadvantages however. For one thing, they may not readily be applied to or removed from a garment. In order to replace a conventional button, the garment must be removed from the body of the wearer, and a needle and a proper color thread utilized. Furthermore, such buttons are not readily removable from the garment, as for cleaning purposes or the like. Often when a garment is cleaned, the rigid buttons will be ruined unless first removed.

It is a cardinal object of this invention, therefore, to provide a garment button construction which may be easily, quickly and conveniently applied to any garment.

It is another primary object hereof to describe a garment button that may be readily removed as for laundering purposes.

Another important object of this device is the provision of a more decorative garment button construction that will not have visible attaching threads.

It is another object and accomplishment hereof to set forth an improved garment button with a quick disconnect fastener element that may be economically mass-produced.

Still another object and purpose of the invention described herein is the provision of a structurally superior button attaching device.

With these objects in view, the invention consists of the novel features of construction and arrangement of parts which will appear in the following specification and recited in the appended claims reference being had to the accompanying drawings in which the same reference numerals indicate the same parts throughout the various figures and in which:

FIG. 10 is a side elevational view of a fifth alternate embodiment of the instant device illustrated applied to a garment fabric or the like.

Figure 1:
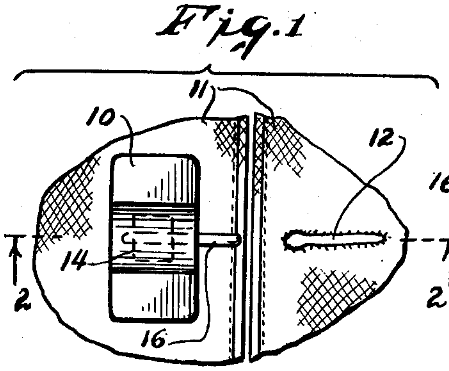
FIG. 1 is a front elevational view of a portion of a garment or the like with one embodiment of the invention installed thereon.
Figure 2:
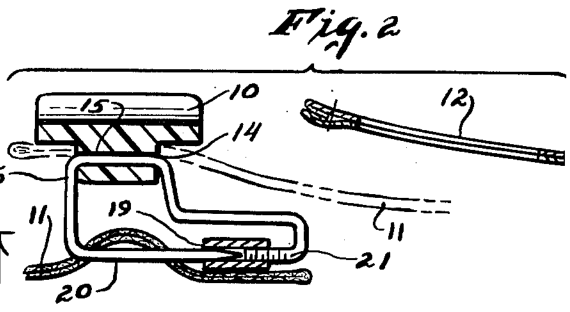
FIG. 2 is a sectional view taken substantially along line 2—2 of FIG. 1.

In FIGS. 1 and 2 of the drawings, there is illustrated a button 10 to be attached to any garment 11 or the like in mating position with a suitable button hole 12.

It will be noted that in this embodiment of the invention, as in the others described hereinafter, the exterior shape and configuration of the button to be attached, and the garment, are merely exemplary and any other well known button or garment shape or construction could be utilized. What is important to the invention is the novel mode of attachment of the various buttons to the garment fabric.

The button 10, however, illustrated herein in FIGS. 1 and 2, has a lower shank portion 14 with a transverse opening 15 therethrough. A fastening member 16 may be passed through the said opening 15 to attach to the garment fabric 11. The said fastening member 16 shown herein will impinge and surround the garment fabric. When in its operative or closed position, the said fastening member 16 will encircle a fully enclosed area of garment fabric 11 thus preventing the removal thereof. In order to lock the said fastening member 16 in its operative position, a collar 19 may be provided to slide over the spear-like portion 20 of the fastening member 16 and to threadingly attach to a mating portion 21 thereof.

Thus, when it is desired to attach this embodiment of the invention to a garment fabric 11, it will merely be necessary to insert the spear-like point of portion 20 through the garment 11 to a position as shown in FIG. 2. The collar 19 will, at that time, be entirely threaded on the mating portion 21 and this will not interfere with the movement of the spear-like portion 20.

When it is desired to lock the parts in this operative position, it will merely be necessary to thread the collar 19 to its position as shown in FIG. 2. This will prevent the removal of the embodiment of the invention depicted. The button 10 is then ready for attachment to the button hole 12.

Correspondingly, this embodiment of the invention may be removed merely by threading the collar 19 entirely on portion 21, thereby permitting free movement of the spear member 20 and its removal from the garment fabric 11.

Figure 3:
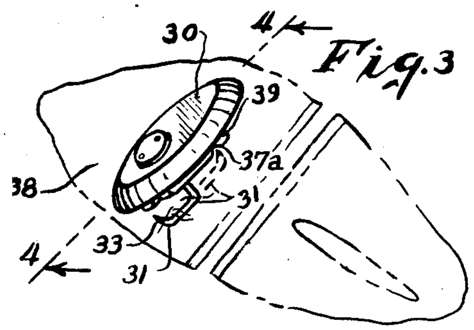
FIG. 3 is a view in perspective of a second embodiment of the instant invention with a portion of a garment shown in phantom.
Figure 4:
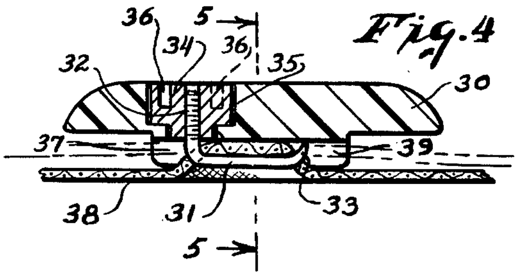
FIG. 4 is a sectional view taken substantially along line 4—4 of FIG. 3.
Figure 5:
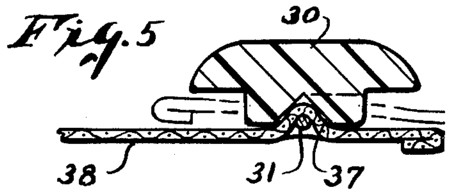
FIG. 5 is a sectional view taken substantially along line 5—5 of FIG. 4.

There is shown in FIGS. 3, 4, and 5 a second preferred embodiment of the instant invention. As heretofore set forth, the shape of the button 30 may be altered as desired. Secured to the underside of the button 30, however, will be a spear fastening member 31. In FIG. 3, the said spear fastening member 31 is illustrated in solid in a position prior to attachment of the button 30 and in phantom in its attached position. As will be seen especially in FIG. 4, the said spear fastening member 31 will be L shaped and will have a threaded portion 32 at an end passing through an opening in the button 30. The said threaded portion 32 will matingly thread within a locking collar 34, preferably within a recess 35 in the top surface of the button 30.

The end of the spear fastening member 31 opposite the threaded portion 32 may have a relatively pointed spear-like tip 33 and may be bent towards the button 30 for fastening as will be immediately hereinafter described.

For ease of removal, the locking collar 34 may have a plurality of recesses and a slot 36 to receive a screw driver or other suitable winding tool.

The operation of this embodiment of the invention is as follows:

With the locking collar 34 partially unwound from the threaded portion 32 as shown in solid in FIG. 3, the spear fastening member 31 may be urged partially away from the underside of the button 30. The relatively sharp spear-like tip 33 of the fastening member 31 may then be caused to penetrate the garment cloth 38 as shown in FIGS. 4 and 5. When the locking collar 34 is tightened on the threaded portion 32, as by means of a suitable tool inserted within slot 36, the fastening member 31 and spear-like tip 33 will be tightened against the button 30 as shown in FIG. 4, thus preventing the removal of the said button 30 from the portion of the garment fabric 38 between fastening member 31 and the button 30.

To assist in the operation of this embodiment of the invention, the underside of the button 30 may have a laterally extending shank portion 39 with a bottom V groove 37 at its underside to receive the fastening member 31. One portion of the groove 37 will be cut away as at 37*a* to permit the spear-like tip 33 to be rotated into and out of the said groove 37 without major unthreading of the locking collar 34.

Figure 6:
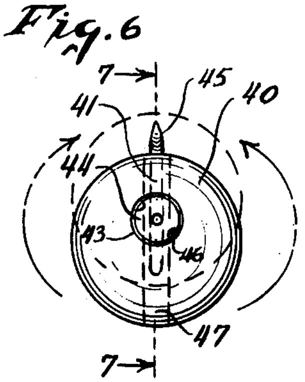
FIG. 6 is a top front plan view of a third alternate embodiment of the instant invention.
Figure 7:
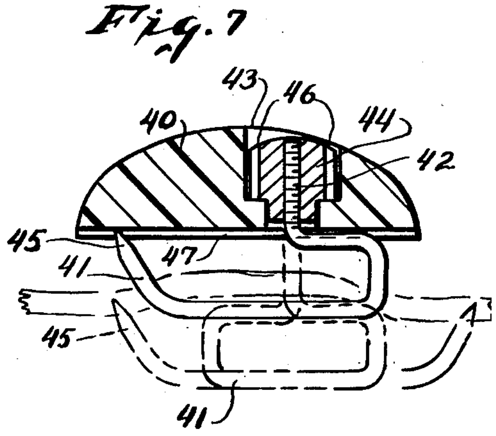
FIG. 7 is a sectional view taken substantially along line 7—7 of FIG. 6.

There is shown in FIGS. 6 and 7 an embodiment of the invention substantially similar to that depicted in FIGS. 3, 4, and 5 above. The button 40 shown in FIGS. 6 and 7 may have a locking collar 44 at the top surface thereof in an offset position. A fastening member 41 below the button 40 may have a threaded portion 42 to pass through an opening 43 in the button 40 to threadingly engage with a locking collar 44. A spear-like portion 45 of the fastening member 41 may lock within a suitable groove 47 at the underside of the said button 40. The operation of this embodiment is as set forth in the previous embodiment.

The fastening member 41 may be loosened and urged partially away from the underside of the button 40 merely by partially unwinding the said locking collar 44. This may be accomplished relatively easily by utilizing a suitable tool fitting within recesses 46 within the collar 44.

Figure 8:
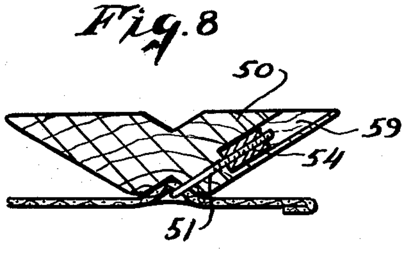
FIG. 8 is a sectional view of a fourth alternate embodiment of the instant invention.
Figure 9:
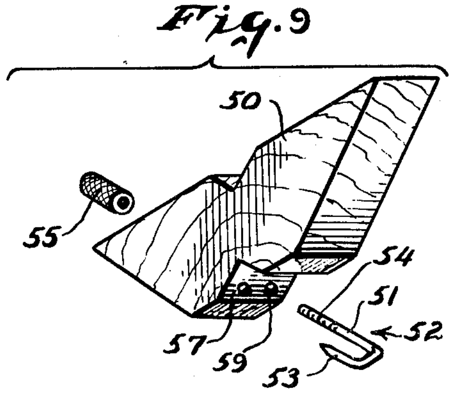
FIG. 9 is a perspective and exploded view of the embodiment of the invention depicted in FIG. 8.

There is shown in FIGS. 8 and 9 another embodiment of this invention. Again, the shape of the button 50 shown therein is in no way limiting.

Extending through the body of the button 50 in an angular fashion through an opening 59 will be the shank portion 51 of a J shaped spear member 52. The shank portion 51 will be relatively long and will have a threaded portion 54 at its end to mate with a locking collar 55 having matching threads. As in the other embodiments of the invention herein, the locking collar 55 may be attached to the shank portion 51 by means other than threads, if desired.

The operation of this embodiment of the invention will be as follows:

When desiring to attach the button 50 to any suitable garment fabric or the like, a spear-like portion 53 of the shank 51 will be inserted through the garment fabric as shown in FIG. 8. The shank 51 will be inserted through the angular opening 59 in the button 50 until the spear-like portion 53 locks against the button 50. For this purpose, and to receive the spear-like portion 53, a groove 57 may be provided at the underside of the button

50. The collar 55 will then be threaded into or otherwise locked against the shank 51 causing the button 50 to be locked to the garment fabric as shown clearly in FIG. 8.

Figure 10:
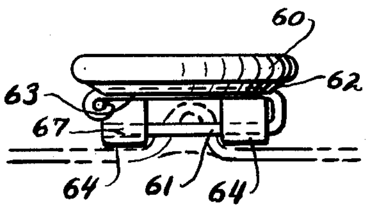
Figure 11:
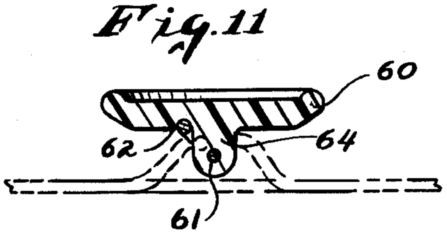
FIG. 11 is a sectional view taken substantially through the center of the embodiment illustrated in FIG. 10.

A fifth embodiment of this invention is set forth particularly in FIGS. 10 and 11. There is mounted to the underside of the button 60 a laterally extending spear-like locking member 61. The button portion 63 of locking member 61 will be rotatably secured against the button as by being snapped within a groove 62 therein. Extending downward from the body of the button 60 will be one or more supports 64 to receive the spear-like portion of the locking member 61.

The operation of this embodiment of the invention may now be described. The locking member 61 will be rotated away from the support 64 and inserted through the garment fabric as indicated in FIG. 11. When in that position, the spear-like tip 67 thereof may be locked within the support 64 so that the button 60 will be permanently retained to the garment material.

In order to insure rigidity of this embodiment of the invention, one or more of the supports 64 may have an insert as of metal therein.

Figure 12:
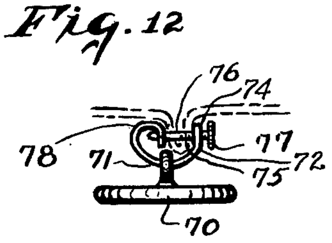
FIG. 12 is an elevational view taken through the center of a sixth alternate embodiment of the invention.

Illustrated in FIG. 12 is still another variation of the inventive concept. Disclosed therein, is a button 70 having an inverted U-shaped support 71 extending thereabove. One of the arms 72 of the said U-shaped support 71 may have a threaded collar 74 thereon to receive the mating threads 75 of a spear-like locking member 76. The other arm 78 of the said U-shaped support 71 will have a suitable opening to receive a portion of the spear-like locking member 76. The threaded portion 75 of the locking member 76 may terminate in a knurled portion 77.

This embodiment will function as follows:

The locking member 76 will be entirely withdrawn from the opening 79 as by turning the same by means of the knurled portion 77. A portion of the garment fabric 73 will be pierced by the spear-like locking member 76. The knurled portion 77 will then be turned until the locking member 76 is at least partially within the opening 79 as illustrated in FIG. 12. This will insure that the button 70 is not removed from the garment fabric 73 inadvertently or spontaneously.

Of course the U-shaped member 71 may be fabricated of metal and rigidly secured to the button 70 or may be integrally molded with the body of the button 70.

Figure 13:
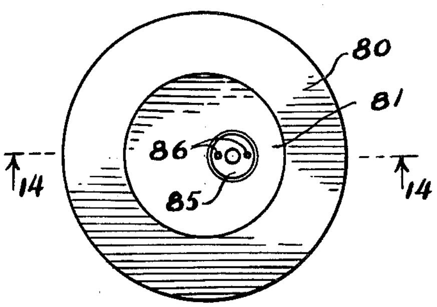
FIG. 13 is a top plan view of a seventh alternate embodiment of the invention.
Figure 14:
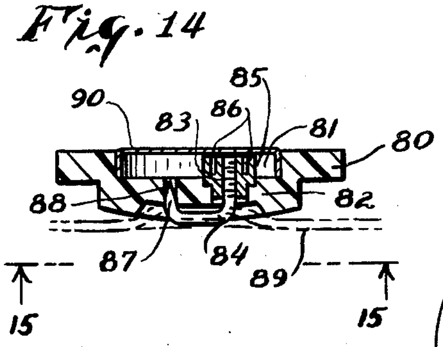
FIG. 14 is an elevational view taken substantially along line 14—14 of FIG. 13.
Figure 15:
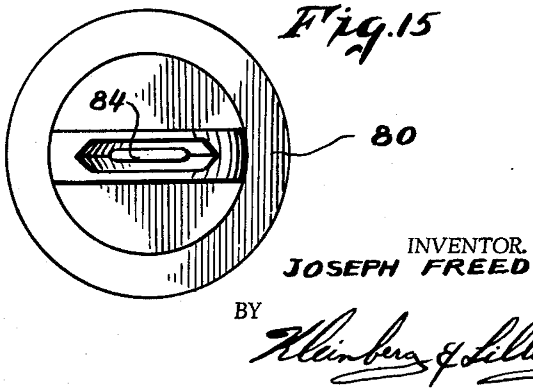
FIG. 15 is a bottom plan view taken substantially along line 15—15 of FIG. 14.

Depicted in FIGS. 13 to 15 is yet another embodiment hereof. As illustrated, this more decorative embodiment will be comprised of a button 80 having an annular recess 81 in the top surface thereof. A transverse opening 82 will be provided through the button 80 terminating within the recess 81. The shank 83 of a J-shaped locking member 84 will be adapted to pass thorugh the said opening 82. The extreme end of the shank 83 will be threaded to engage with a locking collar 85. The said locking collar 85 as seen most clearly in FIG. 14 will fit entirely within the recess 81 and may have suitable openings 86 therein so as to be easily turned by a suitable locking tool (not illustrated). The opposite end of the U-shaped locking member 84 may terminate with a spear-like portion 87 adapted to fit within a second transverse opening 88 within the body of the button 80 when the parts are in their locking position, as shown in FIG. 14.

After the parts are securely locked to the garment fabric 89, as will be hereinafter explained, an insert 90 may be inserted partially into and covering the recess 81. The insert 90 will thereby completely cover the exposed portions of the locking device and will insure a more decorative button 80. Furthermore, it will be realized that inserts 90 for special purposes may be provided such as for advertisements, campaign buttons, or the like.

When applying this embodiment to a garment fabric 89, the locking collar 85 will be unthreaded until the spear-like portion 87 is entirely removed from the second transverse opening 88. While the parts are in that position, the spear-like portion 87 will be inserted through the garment fabric 89 as shown particularly in FIG. 14. The locking collar 85 will then be threaded onto the shank 83, withdrawing the U-shaped locking member 84 into the button 80 so that the spear-like portion 87 securely locks within the second transverse opening 88. This will insure that the parts may not be inadvertently removed from the garment fabric 89.

Of course, it will be seen that embodiments of the invention such as depicted in FIGS. 13, 14 and 15 may be applied to a garment fabric as by a conventional needle and thread if the locking members and their associated parts are removed.

Figure 17:
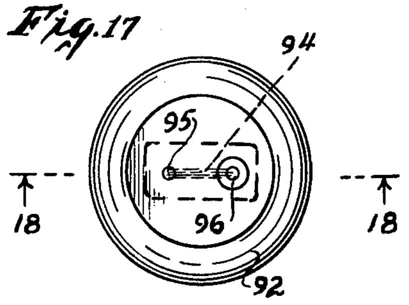
FIG. 17 is a plan view of the embodiment of the invention depicted in FIG. 16.
Figure 18:
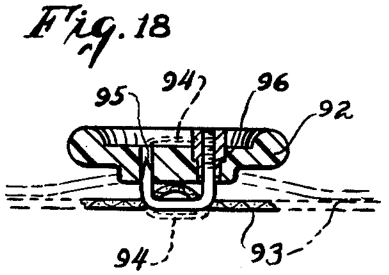
FIG. 18 is a sectional view taken substantially along line 18—18 of FIG. 17.

Thus, referring to FIGS. 17 and 18, there is shown a button 92 applied to a garment fabric 93 as by a locking member heretofore described. There is further illustrated in phantom, however, the use of the button 92 applied to a garment fabric 93 by means of threads 94. As shown, the threads 94 may be looped through the garment fabric 93 and then through the transverse openings 95 and 96 in the button 92 a plurality of times to lock the button 92 securely in position.

Figure 16:
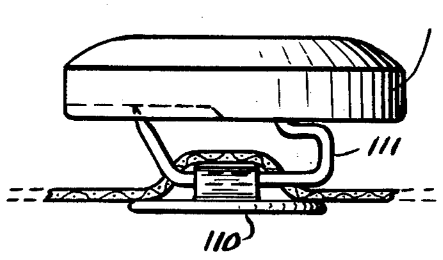
FIG. 16 is a side elevational view of an eighth alternate embodiment of the instant invention.

In FIG. 16 there is illustrated an adaptation of the instant invention which will be applicable to any of the embodiments previously described. As herein illustrated, a backing member 110 is provided partially encircling and thereby fastened to a portion of the locking member 111 of the button 112. This will insure that the locking member 111 cannot pull through and free of the garment fabric 114. Again, it is to be emphasized that the backing member 110 may be applied to any of the configurations hereinbefore described.

Figure 19:
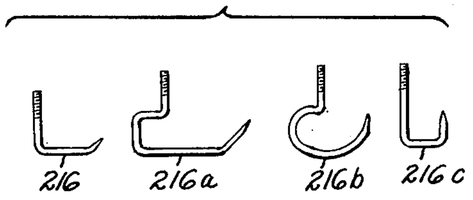
FIG. 19 is a diagrammatic representation of several of the forms of hooking members which may be utilized in conjunction with the various embodiments of the invention depicted herein.

It will be noted that the particular shapes of the various locking members of all of the embodiments mentioned heretofore are shown merely for illustrative purposes. The locking members may assume any predetermined or desired shape. A plurality of such shapes 216, **216*a*, 216*b* and 216*c*** is shown in FIG. 19 for representative purposes.

It will be seen that the embodiments of the invention hereinabove depicted accomplishes all of the objects previously set forth and others. It will be realized that all of the embodiments may be inserted or removed from garments or the like, as desired, but will be secure against spontaneous or inadvertent removal.

Figure 20:
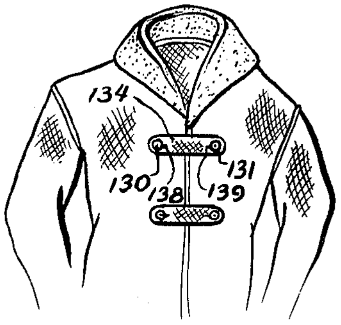
FIG. 20 is an elevational view of a representation of a mode of attaching fastening members to a garment without the necessity of button hole.

Additionally, new and unique results may be obtained when any of the embodiments shown herein are utilized. For example, occasion may arise when it will be desirable to close an opening of a garment where a button hole and other appurtenances have not previously been applied. There is shown in FIG. 20 one method of accomplishing the same. Two buttons 130 and 131 constructed according to any of the embodiments herein above mentioned may be applied and spaced at either side of the opening to be secured. A strap member 134 having two button holes 138 and 139 may then be inserted over each of the buttons, thereby locking the desired portion of a garment.

It will be noted that other advantages of the invention set forth herein have not been described in detail. For example, referring to FIG. 7 of the drawings, it will be seen that the locking collar 44 will be relatively long so as to provide a relatively full threaded engagement with the threaded portion 42 of the fastening member 41. To assist in this purpose, a seat may be provided in the locking collar 44 and the button 40.

While there are above disclosed but a limited number of embodiments of the structure and product of the invention herein presented, it is possible to produce still other embodiments without departing from the inventive concept herein disclosed.

Having thus described my invention and illustrated its use, what I claim as new and desire to secure by Letters Patent is:

A device for attaching a button to material including:

(a) a rigid fastening member attached to said button, (b) said rigid fastening member having a spear-like tip portion, (c) attaching means whereby said rigid fastening member will have a first position wherein said spear-like tip portion will be away from said button to receive the material and a second position wherein said spear-like tip portion will be against said button to prevent the removal of said material, (d) one portion of said rigid fastening member being adapted to extend through said button from one side thereof, (e) and a collar threadingly attached to said one portion of said rigid fastening member at said other side of said button whereby said fastening means may be moved to and away from said second position when said collar is unthreaded from said fastening means and locked in said second position when said collar is entirely threaded on said fastening means, (f) said button having an annular rim on said other side surrounding said collar, (g) and removable cover means attached to said annular rim whereby said collar may be protected when set in position.

References Cited by the Examiner

UNITED STATES PATENTS

| | | | |
|---|---|---|---|
| 342,182 | 5/86 | Chew | 24—103 |
| 700,053 | 5/02 | Kendell | 85—9 |
| 1,062,049 | 5/13 | Stetler | 24—47 |
| 1,387,948 | 8/21 | Silverman | 24—103 |
| 1,410,327 | 3/22 | Lee | 24—103 |
| 1,581,299 | 4/26 | Shiba | 24—90 |

FOREIGN PATENTS

| | | |
|---|---|---|
| 30,058 | 1/85 | Germany. |
| 397,172 | 6/24 | Germany. |
| 662,894 | 7/38 | Germany. |

DONLEY J. STOCKING, *Primary Examiner.*